(12) United States Patent
Benguerah et al.

(10) Patent No.: US 10,193,882 B2
(45) Date of Patent: Jan. 29, 2019

(54) PROVISION OF CROSS-DEVICE IDENTIFICATION

(71) Applicant: Criteo, SA, Paris (FR)

(72) Inventors: Omar Benguerah, Redwood City, CA (US); Bruno Roggeri, Paris (FR); Cédric Roux, Paris (FR)

(73) Assignee: Criteo SA, Paris (FR)

( * ) Notice: Subject to any disclaimer, the term of this patent is extended or adjusted under 35 U.S.C. 154(b) by 214 days.

(21) Appl. No.: 15/180,067

(22) Filed: Jun. 12, 2016

(65) Prior Publication Data

US 2017/0359337 A1  Dec. 14, 2017

(51) Int. Cl.
*H04L 29/06* (2006.01)

(52) U.S. Cl.
CPC ...... *H04L 63/0853* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 2006/0150253 A1 | 7/2006 | Feuerstein et al. | |
| 2007/0168506 A1 | 7/2007 | Douglas et al. | |
| 2009/0024737 A1 | 1/2009 | Goldspink et al. | |
| 2009/0172091 A1 | 7/2009 | Hamel | |
| 2010/0094704 A1 | 4/2010 | Subramanian et al. | |
| 2011/0125595 A1 | 5/2011 | Neal et al. | |
| 2011/0185016 A1 | 7/2011 | Kandasamy et al. | |
| 2011/0225637 A1 | 9/2011 | Counterman | |
| 2012/0022942 A1 | 1/2012 | Holloway et al. | |
| 2012/0023547 A1* | 1/2012 | Maxson | G06F 21/6245 726/1 |
| 2012/0297062 A1 | 11/2012 | Lu et al. | |
| 2013/0145022 A1 | 6/2013 | Srivastava et al. | |
| 2013/0219176 A1* | 8/2013 | Akella | H04L 63/0815 713/165 |
| 2013/0275195 A1 | 10/2013 | Gabryelski et al. | |
| 2013/0339139 A1 | 12/2013 | Meyers et al. | |
| 2014/0120864 A1* | 5/2014 | Manolarakis | H04W 24/08 455/405 |
| 2014/0164111 A1 | 6/2014 | Rodriguez et al. | |
| 2014/0180829 A1 | 6/2014 | Umeda | |

(Continued)

*Primary Examiner* — John B King
*Assistant Examiner* — Carlos E Amorin
(74) *Attorney, Agent, or Firm* — Proskauer Rose LLP

(57) ABSTRACT

Described are methods, systems, and apparatus, including computer program products for provision of cross-device identifiers. A cross-device ID is assigned by a computing entity matching system on a first domain to a browser and to one or more computing entities. A request for a webpage is sent by the browser to a server on a second domain. The webpage, including cross-device ID retrieval instructions, is received by the browser. The cross-device ID retrieval instructions are executed to send a request to the computing entity matching system including a matching system ID. The cross-device ID is determined based on the matching system ID. Cross-device ID storage instructions, including a distributed cross-device ID, are sent by the computing entity matching system. The cross-device ID storage instructions are executed by the browser. A request for a webpage, including the distributed cross-device ID, is sent by the browser to the server.

10 Claims, 10 Drawing Sheets

(56) References Cited

U.S. PATENT DOCUMENTS

| | | | |
|---|---|---|---|
| 2014/0223462 A1 | 8/2014 | Aimone et al. | |
| 2014/0316902 A1 | 10/2014 | Le Jouan | |
| 2014/0365304 A1* | 12/2014 | Showers | G06Q 30/02 |
| | | | 705/14.55 |
| 2015/0051968 A1 | 2/2015 | Sotelo et al. | |
| 2015/0052217 A1 | 2/2015 | Benguerah et al. | |
| 2015/0058141 A1 | 2/2015 | Yablonka et al. | |
| 2015/0082345 A1 | 3/2015 | Archer et al. | |
| 2015/0134459 A1* | 5/2015 | Dipaola | G06Q 30/0261 |
| | | | 705/14.64 |
| 2015/0154650 A1 | 6/2015 | Umeda | |
| 2015/0181311 A1 | 6/2015 | Navin et al. | |
| 2015/0324857 A1* | 11/2015 | Siegel | G06Q 30/0267 |
| | | | 705/14.64 |
| 2015/0379554 A1* | 12/2015 | Copeland | G06Q 30/0239 |
| | | | 705/14.39 |
| 2016/0098765 A1 | 4/2016 | Ishida | |
| 2016/0125471 A1* | 5/2016 | Hsu | G06Q 30/0269 |
| | | | 705/14.66 |
| 2016/0182657 A1* | 6/2016 | Mukherjee | H04L 67/22 |
| | | | 709/223 |
| 2016/0219176 A1* | 7/2016 | Nakao | H04N 1/00899 |
| 2016/0234203 A1* | 8/2016 | Gatto | H04L 67/22 |
| 2017/0034174 A1* | 2/2017 | Jagers | H04L 63/10 |
| 2017/0085522 A1* | 3/2017 | Greene | G06F 17/30902 |
| 2017/0154366 A1* | 6/2017 | Turgeman | G06Q 30/0275 |
| 2017/0180797 A1* | 6/2017 | Splaine | H04N 21/44213 |
| 2017/0337588 A1* | 11/2017 | Chittilappilly | G06Q 30/0277 |

\* cited by examiner

PROVISION OF CROSS-DEVICE IDENTIFICATION

FIELD OF THE TECHNOLOGY

The present technology relates generally to identifying devices, browsers, and/or applications used by a user and, more specifically, to provision of a cross-device ID associated with two or more of the devices, browsers, and/or applications used by the user.

BACKGROUND

Users can use a variety of devices, such as PCs, tablets, mobile phones, and other computing devices to consume and/or interact with online content. Further, users can use separate browsers or applications on the same device or different devices to consume and/or interact with online content. Each device, browser, and/or application can have its own identifier. For example, IOS devices can utilize an Identifier for Advertisers ("IDFA") or ANDROID devices can utilize an Advertising ID. Browsers can utilize other identifiers, many of which can be stored in cookies associated with separate domains. Ad systems, third-party data aggregators, merchants, and publishers can collect activity data based on a device's interactions with websites and other online content. Because each device, browser, and/or application can have its own identifier, identifying all devices, browsers, and/or applications used by a particular user and the associated activity data can be difficult. Further, some parties, such as merchants and publishers, may not have access to all of the activity data (e.g., activity data related to content that they do not own). Accordingly, they may not be able to determine which devices, browsers, and/or applications are used by the same user.

SUMMARY OF THE TECHNOLOGY

Accordingly, there is a need for technology to provide cross-device IDs to facilitate identification of the devices, browsers, and/or applications used by the same user. In one aspect of the technology, there is a method. The method includes assigning, by a computing entity matching system on a first domain, a cross-device ID to a browser executing on a first computing device and to one or more computing entities based on one or more of activity data for the browser and the one or more computing entities collected by the computing entity matching system and activity data for the browser and the one or more computing entities collected by a plurality of third-parties. The method includes sending, by the browser, to a server on a second domain, a first request for a first webpage. The method includes receiving, by the browser, the first webpage, the first webpage including first cross-device ID retrieval instructions. The method includes executing, by the browser, the first cross-device ID retrieval instructions to send a second request to the computing entity matching system including a matching system ID. The method includes determining, by the computing entity matching system, the cross-device ID based on the matching system ID. The method includes sending, by the computing entity matching system, to the browser, first cross-device ID storage instructions including a distributed cross-device ID, the distributed cross-device ID based on the cross-device ID. The method includes executing, by the browser, the first cross-device ID storage instructions to set a cookie on the second domain including the distributed cross-device ID. The method includes sending, by the browser, to the server, a third request for a second webpage, the third request including the distributed cross-device ID.

In some embodiments, each computing entity of the one or more computing entities is one of a computing device, a browser, or an application. In some embodiments, the distributed cross-device ID is determined by applying a one-way hashing function to the cross-device ID. In some embodiments, the first webpage and the second webpage are associated with a first third-party, and the distributed cross-device ID is determined by encrypting the cross-device ID with an encryption key associated with the first third-party. In some embodiments, the first webpage and the second webpage are associated with a first third-party, and the distributed cross-device ID is determined by applying a first third-party-specific mapping to the cross-device ID. In some embodiments, the distributed cross-device ID is the cross-device ID.

In some embodiments, the method can include determining, by the computing entity matching system, a user of the browser has not opted out of cross-device identification based on one or more of the matching system ID or the cross-device ID. In some embodiments, the method can include associating, by the server, browser activity with the distributed cross-device ID.

In some embodiments, the method can include sending, by the browser, to the server on the second domain, a fourth request for a third webpage. In some embodiments, the method can include receiving, by the browser, the third webpage, the third webpage including second cross-device ID retrieval instructions. In some embodiments, the method can include executing, by the browser, the cross-device ID retrieval instructions to send a fifth request to the computing entity matching system including the matching system ID and the distributed cross-device ID. In some embodiments, the method can include determining, by the computing entity matching system, a user of the browser has opted out of cross-device identification based on one or more of the matching system ID or the cross-device ID. In some embodiments, the method can include sending, by the computing entity matching system, to the browser, second cross-device ID storage instructions including opt-out indicia. In some embodiments, the method can include executing, by the browser, the second cross-device ID storage instructions to replace the distributed cross-device ID in the cookie on the second domain with the opt-out indicia. In some embodiments, the method can include sending, by the browser, to the server, a sixth request for a fourth webpage, the sixth request including the opt-out indicia. In some embodiments, the method can include disassociating, by the server, browser activity of the browser with the distributed cross-device ID in response to receiving the opt-out indicia.

In another aspect, there is a method. The method includes assigning, by a computing entity matching system, a cross-device ID to an application executing on a first computing device and to one or more computing entities based on one or more of activity data for the application and the one or more computing entities collected by the computing entity matching system and activity data for the application and the one or more computing entities collected by a plurality of third-parties. The method includes sending, by the application, to a server associated with a first third-party associated with the application, a first request including a device ID. The method includes sending, by the server, to the computing entity matching system, a second request including the device ID. The method includes determining, by the computing entity matching system, the cross-device ID based on the device ID. The method includes sending, by the computing entity matching system, to the server, a distributed cross-device ID based on the cross-device ID.

In some embodiments, the method can include, prior to sending the first request, sending, by one of the application or the server associated with the first third-party associated with the application, to the computing entity matching system, a third request including the device ID; determining, by the computing entity matching system, the cross-device ID based on the device ID; associating, by the computing entity matching system, the cross-device ID with the first third-party. In some embodiments, the method can include, prior to sending the distributed cross-device ID, determining, by the computing entity matching system, the cross-device ID is associated with the first third-party.

In some embodiments, each computing entity of the one or more computing entities is one of a computing device, a browser, or an application. In some embodiments, the distributed cross-device ID is determined by applying a one-way function to the cross-device ID. In some embodiments, the distributed cross-device ID is determined by encrypting the cross-device ID with an encryption key associated with the first third-party. In some embodiments, the distributed cross-device ID is determined by applying a first third-party-specific mapping to the cross-device ID. In some embodiments, the distributed cross-device ID is the cross-device ID.

In some embodiments, the method can include determining, by the computing entity matching system, a user of the application has not opted out of cross-device identification based on one or more of the device ID or the cross-device ID. In some embodiments, the method can include associating, by the server, application activity with the distributed cross-device ID.

In some embodiments, the method can include sending, by the application, to the server associated with the first third-party, a third request including the device ID. In some embodiments, the method can include sending, by the server, to the computing entity matching system, a fourth request including the device ID. In some embodiments, the method can include determining, by the computing entity matching system, the cross-device ID based on the device ID. In some embodiments, the method can include determining, by the computing entity matching system, a user of the application has opted out of cross-device identification based on one or more of the device ID or the cross-device ID. In some embodiments, the method can include sending, by the computing entity matching system, to the server, opt-out indicia. In some embodiments, the method can include disassociating, by the server, application activity of the application with the distributed cross-device ID in response to receiving the opt-out indicia.

In another aspect, there is a method. The method includes assigning, by a computing entity matching system, a cross-device ID to an application executing on a first computing device and to one or more computing entities based on one or more of activity data for the application and the one or more computing entities collected by the computing entity matching system and activity data for the application and the one or more computing entities collected by a plurality of third-parties. The method includes sending, by the application, to the computing entity matching system, a first request including a device ID. The method includes determining, by the computing entity matching system, the cross-device ID based on the device ID. The method includes sending, by the computing entity matching system, to the application, a distributed cross-device ID based on the cross-device ID. The method includes sending, by the application, to a server associated with a first third-party associated with the application, the distributed cross-device ID.

In some embodiments, the method can include, prior to sending the first request, sending, by one of the application or the server associated with the first third-party associated with the application, to the computing entity matching system, a second request including the device ID; determining, by the computing entity matching system, the cross-device ID based on the device ID; associating, by the computing entity matching system, the cross-device ID with the first third-party; and determining, by the computing entity matching system, the cross-device ID is associated with the first third-party.

In some embodiments, each computing entity of the one or more computing entities is one of a computing device, a browser, or an application. In some embodiments, the distributed cross-device ID is determined by applying a one-way hashing function to the cross-device ID. In some embodiments, the distributed cross-device ID is determined by encrypting the cross-device ID with an encryption key associated with the first third-party. In some embodiments, the distributed cross-device ID is determined by applying a first third-party-specific mapping to the cross-device ID. In some embodiments, the distributed cross-device ID is the cross-device ID.

In some embodiments, the method can include determining, by the computing entity matching system, a user of the application has not opted out of cross-device identification based on one or more of the device ID or the cross-device ID. In some embodiments, the method can include associating, by the server, application activity with the distributed cross-device ID.

In some embodiments, the method can include sending, by the application, to the computing entity matching system, a second request including the device ID. In some embodiments, the method can include determining, by the computing entity matching system, the cross-device ID based on the device ID. In some embodiments, the method can include determining, by the computing entity matching system, a user of the application has opted out of cross-device identification based on one or more of the device ID or the cross-device ID. In some embodiments, the method can include sending, by the computing entity matching system, to the application, opt-out indicia. In some embodiments, the method can include sending, by the application, to the server, the opt-out indicia. In some embodiments, the method can include disassociating, by the server, application activity of the application with the distributed cross-device ID in response to receiving the opt-out indicia.

In another aspect, there is a method. The method includes assigning, by a computing entity matching system on a first domain, a cross-device ID to a browser executing on a first computing device and to one or more computing entities based on one or more of activity data for the browser and the one or more computing entities collected by the computing entity matching system and activity data for the browser and the one or more computing entities collected by a plurality of third-parties. The method includes sending, by the browser, to a first server on a second domain, a first request for a first webpage. The method includes receiving, by the browser, the first webpage, the first webpage including first cross-device ID retrieval instructions. The method includes executing, by the browser, the first cross-device ID retrieval instructions to send a second request to the computing entity matching system including a matching system ID. The method includes determining, by the computing entity matching system, the cross-device ID based on the matching system ID. The method includes sending, by the computing entity matching system, to the browser, first cross-device ID provision instructions including a URL of a second server and a distributed cross-device ID, the distributed cross-device ID based on the cross-device ID. The method includes executing, by the browser, the first cross-device ID provision instructions to send a third request to the second server including the distributed cross-device ID.

In some embodiments, each computing entity of the one or more computing entities is one of a computing device, a browser, or an application. In some embodiments, the distributed cross-device ID is determined by applying a one-way hashing function to the cross-device ID. In some embodiments, the second server is associated with a first third-party, and the distributed cross-device ID is determined by encrypting the cross-device ID with an encryption key associated with the first third-party. In some embodiments, the second server is associated with a first third-party, and the distributed cross-device ID is determined by applying a first third-party-specific mapping to the cross-device ID. In some embodiments, the distributed cross-device ID is the cross-device ID.

In some embodiments, the method can include determining, by the computing entity matching system, a user of the browser has not opted out of cross-device identification based on one or more of the matching system ID or the cross-device ID. In some embodiments, the method can include associating, by second the server, browser activity with the distributed cross-device ID.

In some embodiments, the method can include sending, by the browser, to the first server on the second domain, a fourth request for a second webpage; receiving, by the browser, the second webpage, the second webpage including second cross-device ID retrieval instructions; executing, by the browser, the second cross-device ID retrieval instructions to send a fifth request to the computing entity matching system including the matching system ID; determining, by the computing entity matching system, a user of the browser has opted out of cross-device identification based on one or more of the matching system ID; sending, by the computing entity matching system, to the browser, second cross-device ID provision instructions including the URL of the second server and opt-out indicia; and executing, by the browser, the second cross-device ID provision instructions to send a sixth request to the second server including the opt-out indicia. In some embodiments, the method can include disassociating, by the second server, browser activity of the browser with the distributed cross-device ID in response to receiving the opt-out indicia. In some embodiments, the first server is the same as the second server.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

Environment and Systems

Figure 1:
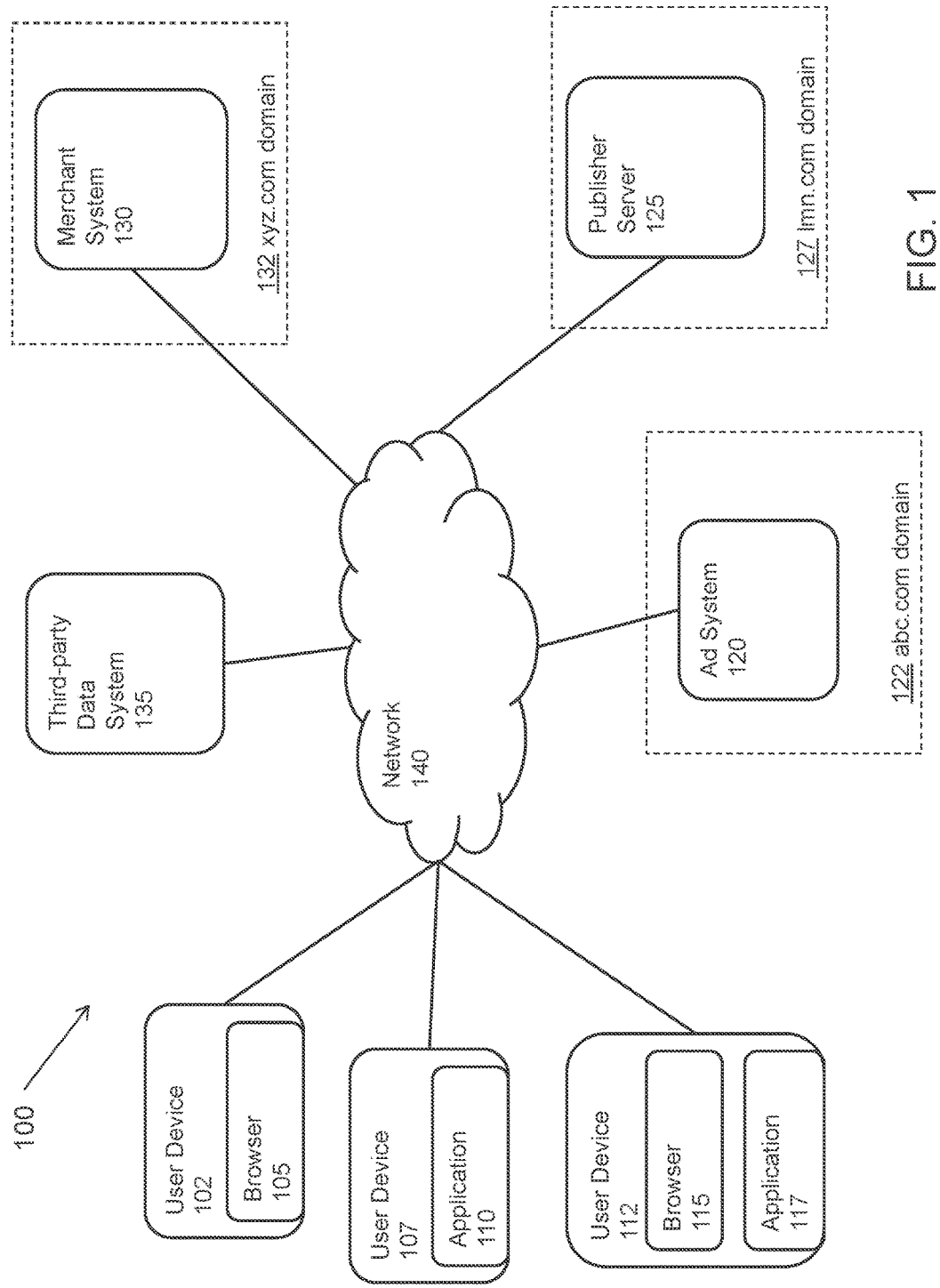
FIG. 1 is a diagram of a networked system in accordance with embodiments of the technology.

FIG. 1 is a diagram of a networked system 100 in accordance with embodiments of the technology. As illustrated, networked system 100 can include user device 102, user device 107, user device 112, ad system 120, publisher server 125, merchant system 130, and third-party data system 135. User device 102, user device 107, user device 112, ad system 120, publisher server 125, merchant system 130, and third-party data system 135 can be in data communication via network 140. User devices 102, 107, and 112 can each be any computing devices. In some embodiments, user devices 102, 107, and 112 can each be one of a mobile computing device (e.g., cellular phones and/or tablets), a PC or other computing device. User device 102 executes web browser 105. User device 107 executes application 110 (e.g., a mobile app that interacts with online content). User device 112 executes web browser 115 and application 117.

Ad system 120 can be any computing device, such as a server or multiple servers. In some embodiments, ad system 120 can collect activity data for a plurality of devices, browsers, and/or applications. In some embodiments, ad system 120 can receive activity data for a plurality of devices, browsers, and/or applications from third-parties. In some embodiments, ad system 120 can determine two or more devices, browsers, and/or applications are used by the same user based on the activity data. Ad system 120 can be on domain 122.

Publisher server 125 can be any computing device, such as a server or multiple servers. In some embodiments, publisher server 125 can serve webpages to browsers 105 and 115. In some embodiments, publisher server 125 can serve other content to applications 110 and 117. Publisher server 125 can be on domain 127, different from domain 122. Merchant system 130 can be any computing device, such as a server or multiple servers. In some embodiments, merchant system 130 can serve webpages to browsers 105 and 115. In some embodiments, merchant system 130 can serve other content to applications 110 and 117. Merchant system 130 can be on domain 132, different from domain 122 and domain 127. Third-party data system 135 can be any computing device, such as a server or multiple servers. Network 140 can be any network or multiple networks. For example, network 140 can include cellular networks through which user devices 102, 107, and 112 are connected and the Internet.

Methods for Providing a Cross-Device ID

Figure 2:
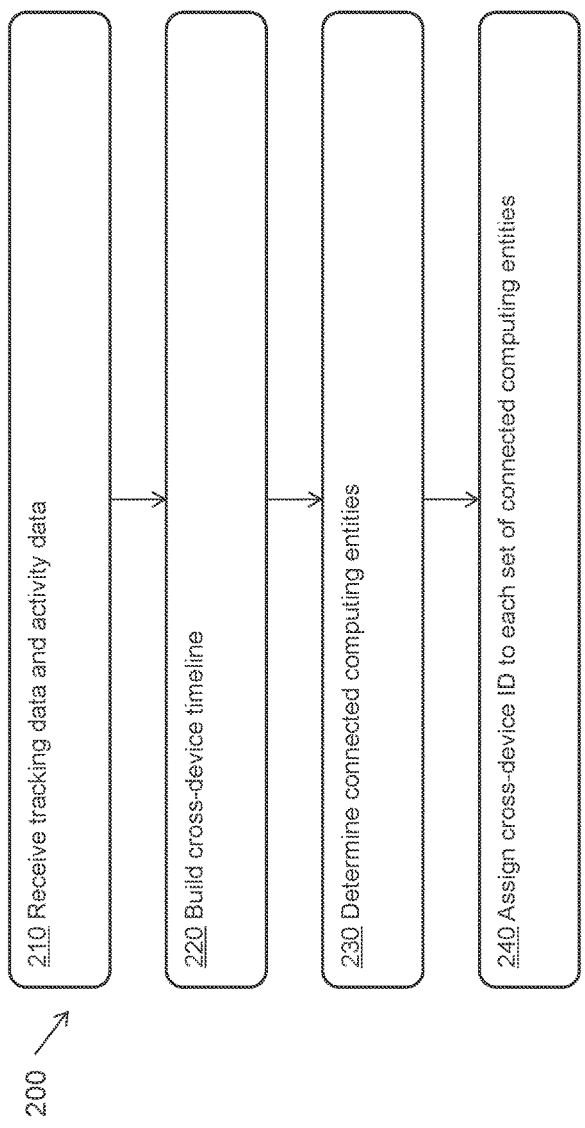
FIG. 2 depicts a flow chart of a method for determining and assigning a cross-device ID to two or more computing entities.

FIG. 2 depicts flow chart 200 of a method for determining and assigning a cross-device ID to two or more computing entities. The cross-device ID can be assigned to two or more computing entities when the two or more computing entities are used by the same user (or there is a high probability the two or more computing entities are used by the same user). A computing entity can be a computing device, a browser, or an application. A cross-device ID can be assigned to two or more computing entities, such as separate user devices or browsers or applications executing on separate user devices. In some instances, a user device can contain two or more computing entities. For example, user device 112 is illustrated as containing browser 115 and application 117. A cross-device ID can be assigned to browser 115 and application 117, as well as other computing entities on separate user devices.

The method illustrated in FIG. 2 can be performed by a computing entity matching system that uses activity data to identify computing entities associated with the same user. For example, ad system 120 can perform the illustrated method. As another example, a data management platform can perform the illustrated method. At step 210, the computing entity matching system can receive activity data. In some embodiments, such as when the computing entity matching system is ad system 120, the computing entity matching system can itself collect activity data reflecting how various devices interact with online content (e.g., views, clicks, etc.). The computing entity matching system can store the activity data as associated with a matching system ID for a particular computing entity. In some embodiments, the computing entity matching system can receive activity data from third-parties. For example, one or more merchant systems can provide data about users, viewing and purchasing activity of the user, and the devices used by the users for that activity. As another example, third-party data systems can provide similar activity data. The activity data can provide information about the activity and an identifier of the user (e.g., a hashed email address) and/or an identifier of the device.

At step 220, the computing entity matching system can build a cross-device timeline. In the cross-device timeline, the activity data can be arranged in chronological order and events from the data (e.g., views, clicks, purchases, etc.) can be matched based on, for example, user identifiers, computing entity identifiers, device identifiers, timestamps, and/or data sources. At step 230, the computing entity matching system can determine connected computing entities based on the cross-device timeline. For example, in some cases, the computing entity matching system can use the data from disparate sources relating to the same event to find connections to other events, and thereby connect computing entities as used by the same user. At step 240, the computing entity matching system can assign a cross-device ID to each set of connected computing entities. For example, the computing entity matching system can assign a cross-device ID to each set of two or more computing entities it determines are associated with the same user. In some embodiments, the computing entity matching system can associate the cross-device ID assigned to the set with the matching system ID, device ID, or other ID associated with each computing entity in the set. In some embodiments, the computing entity matching system can update the cross-device ID assigned to a set of computing entities. For example, if the computing entity matching system can determine two sets of computing entities that were previously assigned separate cross-device IDs are used by the same user, the two sets can be combined and assigned a single cross-device ID.

Figure 3:
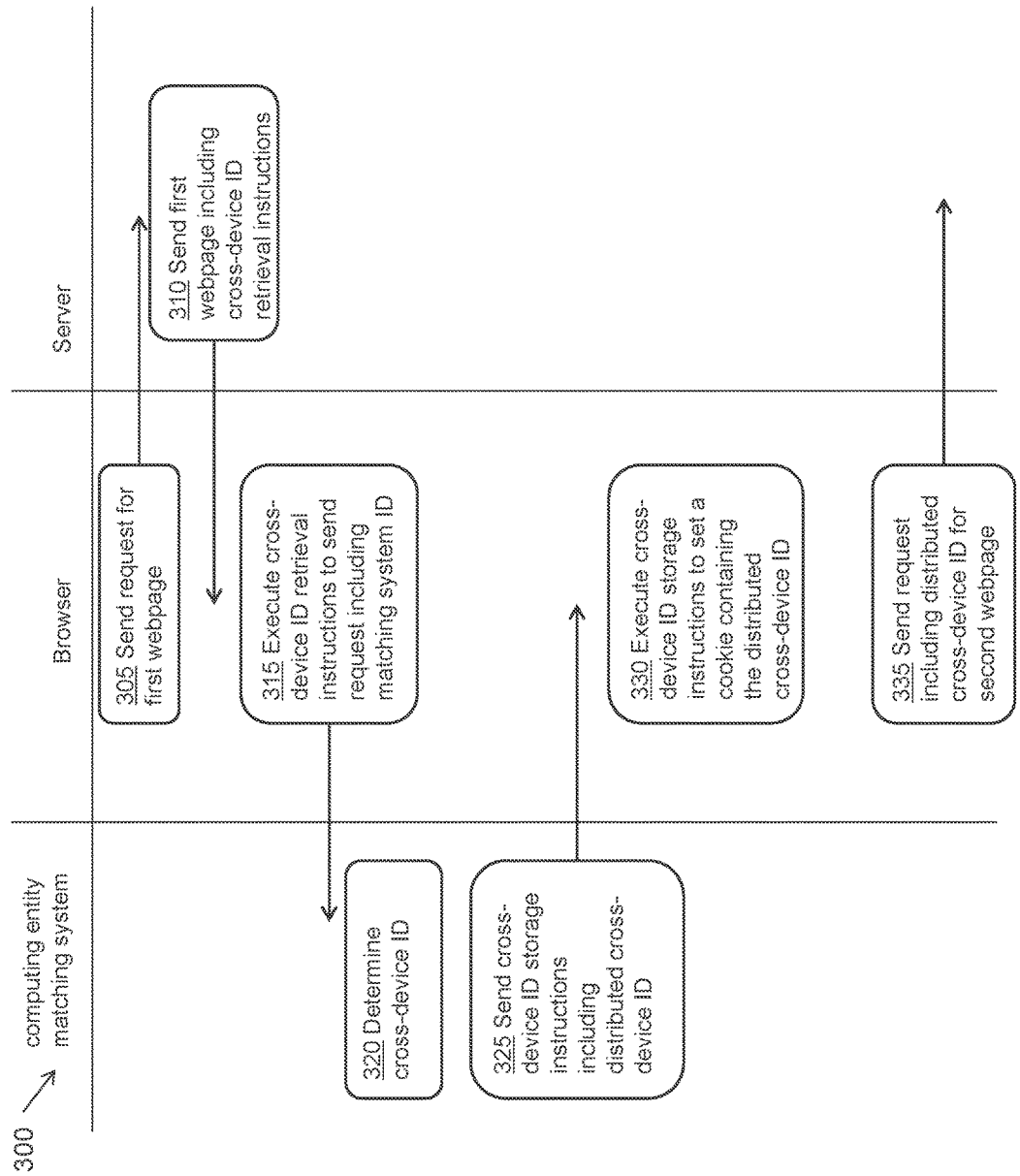
FIG. 3 depicts a flow chart of a method of providing cross-device identification information.

The computing entity matching system can provide the cross-device identification information for a particular device to third-party systems. FIG. 3 depicts flow chart 300 of a method of providing cross-device identification information. At step 305, a browser (e.g., browser 105 or 115) sends to a server (e.g., publisher server 125 or merchant system 130) a request for a first webpage. At step 310, the server can send the first webpage. In some embodiments, the first webpage can include cross-device ID retrieval instructions. The cross-device ID retrieval instructions can be JAVASCRIPT instructions that when executed by the browser can cause the browser to send a request to the computing entity matching system. At step 315, the browser executes the cross-device ID retrieval instructions to send a request to the computing entity matching system. The request can include a matching system ID. In some embodiments, the matching system ID is stored by the browser in a browser cookie on the computing entity matching system's domain. In many implementations, the browser can prevent the webpage received from the server, which is on another domain, from accessing the cookie on the computing entity matching system's domain. Beneficially, by sending the request to the computing entity matching system, the browser can include the contents of the cookie with the request.

At step 320, the computing entity matching system can determine a cross-device ID based on the matching system ID received from the browser. As previously discussed with reference to FIG. 2, the computing entity matching system can maintain associations between matching system IDs and cross-device IDs. The computing entity matching system can look up the cross-device ID based on the received matching system ID. At step 325, the computing entity matching system can send to the browser cross-device ID storage instructions. The cross-device ID storage instruction can include a distributed cross-device ID. The computing entity matching system can generate the distributed cross-device ID based on the cross-device ID. In some embodiments, the computing entity matching system can generate the distributed cross-device ID by applying a one-way hashing function (e.g., MD or SHA) to the cross-device ID. In some embodiments, the computing entity matching system can generate the distributed cross-device ID by encrypting the cross-device ID with an encryption key associated with the server or a party that controls the server. In some embodiments, the computing entity matching system can generate the distributed cross-device ID by applying a party-specific mapping to the cross-device ID. Beneficially, obfuscating the cross-device ID in a party-specific manner can limit which systems can use the distributed cross-device ID. In some embodiments, the distributed cross-device ID is the cross-device ID.

In some embodiments, the computing entity matching system can determine whether a user of the browser has opted out of cross-device identification. For example, a user of the browser can elect to opt out of cross-device identification in response to a message previously displayed to the user on the current or a previous web page. The computing entity matching system can associate the user's opt-out preference with the matching system ID and/or the cross-device ID in order to track the user's opt-out preference. If the user has opted out, the computing entity matching system can send opt-out indicia (e.g., the string "opt-out") instead of a distributed cross-device ID. If the user has not opted out, the computing entity matching system can provide the distributed cross-device ID.

At step 330, the browser can execute the cross-device ID storage instructions to set a cookie on the server's domain. The cross-device ID storage instruction can be JAVASCRIPT instructions. The cookie can contain the cross-device ID. Beneficially, the browser can set the cookie as a first-party cookie on the server's domain because the cross-device ID storage instructions execute in the webpage from the server's domain. At step 335, the browser can send to the server (or a second server on the server's domain) a request for a second webpage. The request can include the distributed cross-device ID. For example, the browser can send the contents of the cookie containing the cross-device ID to the server because the cookie is on the server's domain. In some embodiments, the server can then associate browser activity by the browser with the distributed cross-device ID. Beneficially, the server can determine that the browser activity is associated with the same user as other computing entities associated with the same cross-device ID.

Figure 4:
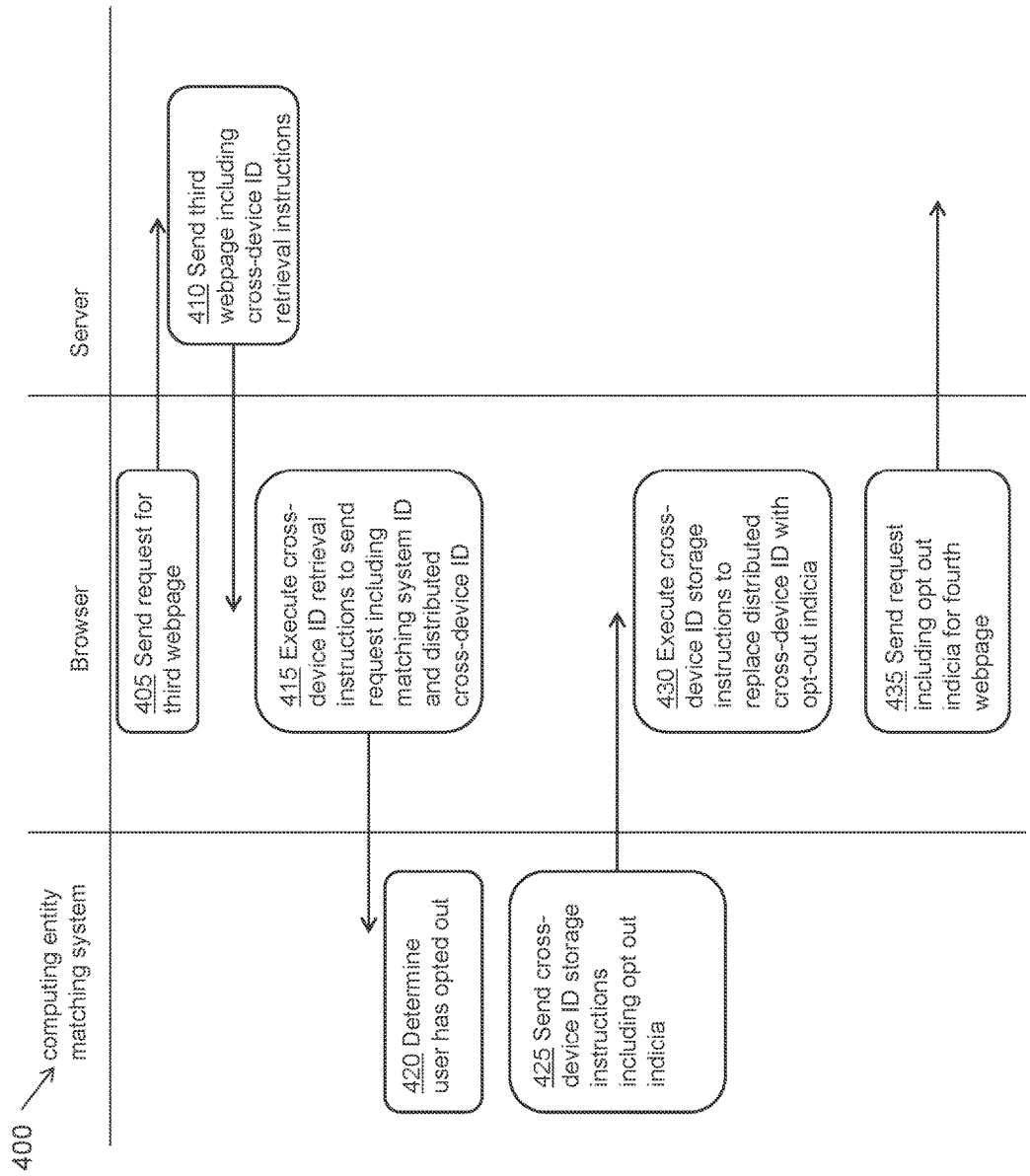
FIG. 4 depicts a flow chart of a method of providing opt-out indicia in place of a distributed cross-device ID.

FIG. 4 depicts flow chart 400 of a method of providing opt-out indicia in place of a distributed cross-device ID. At step 405, the browser can send to the server a request for a third webpage. At step 410, the server can send the third webpage. The third webpage can include cross-device ID retrieval instructions. At step 415, the browser can execute the cross-device ID retrieval instructions to send a request to the computing entity matching system. The request can include a matching system ID. In some embodiments, the request can include a previously received distributed cross-device ID. For example, a distributed cross-device ID from a cookie on the server's domain stored on the browser can be sent with the request. At step 420, the computing entity matching system can determine a user of the browser has opted out of cross-device identification based on the matching system ID and/or the cross-device ID. For example, the computing entity matching system can store for retrieval the user's opt-out preference as associated with the matching system ID and/or the cross-device ID. At step 425, the computing entity matching system can send to the browser cross-device ID storage instructions including opt-out indicia instead of a distributed cross-device ID. The opt-out indicia can be any data that indicates the user has opted out. For example, the opt-out indicia can be the string "opt-out."

At step 430, the browser can execute the cross-device ID storage instructions to replace the distributed cross-device ID in the cookie on the server's domain with the opt-out indicia. For example, the browser can store the string "opt-out" in the cookie on the server's domain that previously contained the distributed cross-device ID. At step 435, the browser can send to the server (or a second server on the server's domain) a request for a fourth webpage. The request can include the opt-out indicia. For example, the browser can send the contents of the cookie containing the opt-out indicia to the server because the cookie is on the server's domain. In some embodiments, the server can then disassociate any browser activity by the browser that it previously associated with the distributed cross-device ID. For example, the server can remove any data it stores that indicates the browser activity is associated with the previously distributed cross-device ID.

Figure 5:
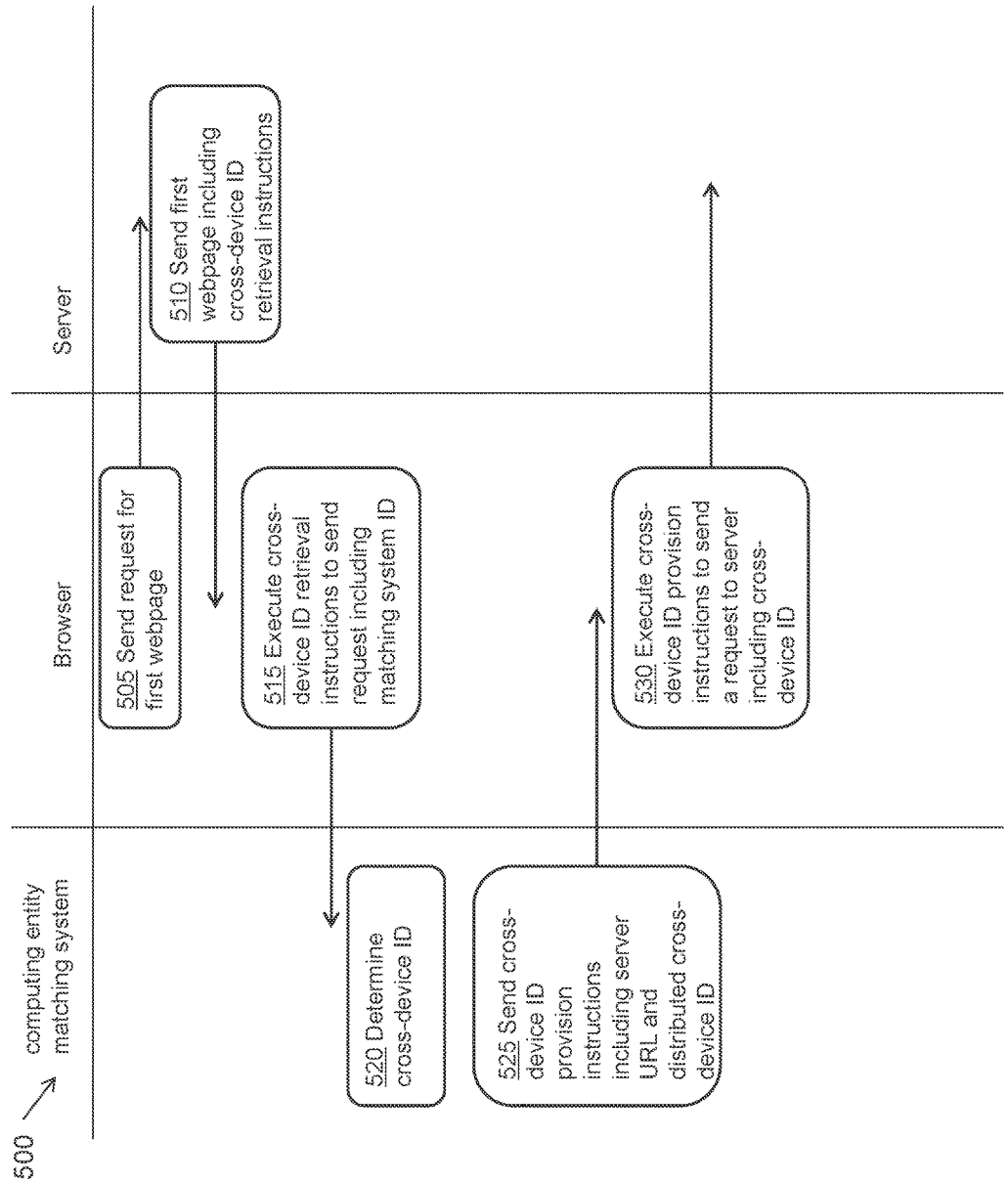
FIG. 5 depicts a flow chart of a method of providing cross-device identification information.

FIG. 5 depicts flow chart 500 of a method of providing cross-device identification information. At step 505, a browser sends to a server a request for a first webpage. At step 510, the server can send the first webpage. In some embodiments, the first webpage can include cross-device ID retrieval instructions. At step 515, the browser executes the cross-device ID retrieval instructions to send a request to the computing entity matching system. The request can include a matching system ID. At step 520, the computing entity matching system can determine a cross-device ID based on the matching system ID received from the browser. As previously discussed with reference to FIG. 2, the computing entity matching system can maintain associations between matching system IDs and cross-device IDs. The computing entity matching system can look up the cross-device ID based on the received matching system ID. At step 525, the computing entity matching system can send to the browser cross-device ID provision instructions. The cross-device ID provision instructions can include a distributed cross-device ID, as described above. The cross-device ID provision instructions can include a URL for a server (e.g., the server serving the first webpage or a different server). In some embodiments, the cross-device ID provision instructions can be a pixel (e.g., a 1×1 image) where the source URL includes the URL for the server and the distributed cross-device ID. In some embodiments, the computing entity matching system can determine whether a user of the browser has opted out of cross-device identification, as described above. At step 530, the browser can execute the cross-device ID storage provision instructions to send a request to the server (or a different server) including the distributed cross-device ID. For example, the distributed cross-device ID can be sent to the server as a part of the URL used by the browser for the request. In some embodiments, the server can then associate browser activity by the browser with the distributed cross-device ID. Beneficially, the server can determine that the browser activity is associated with the same user as other computing entities associated with the same cross-device ID.

Figure 6:
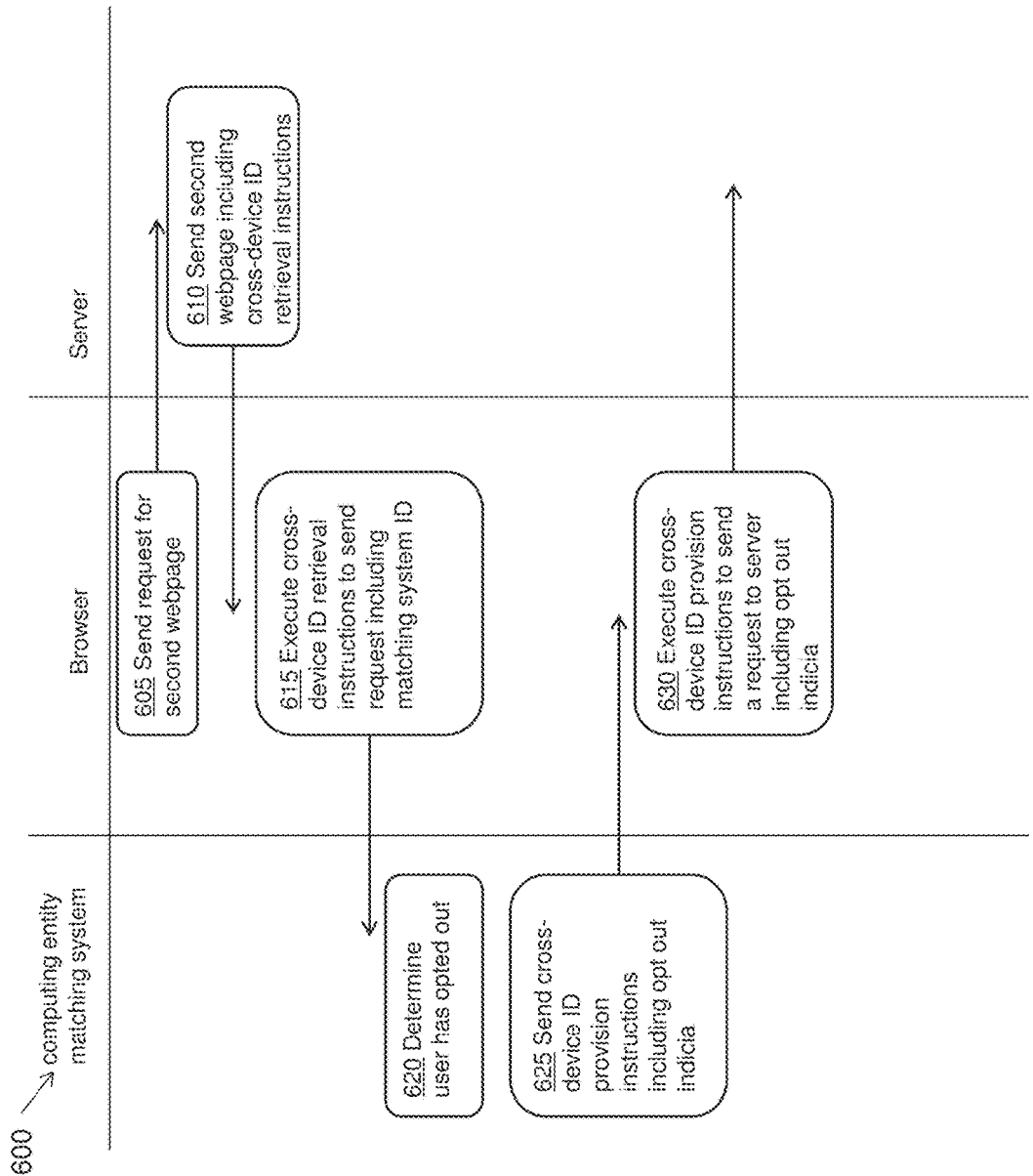
FIG. 6 depicts a flow chart of a method of providing opt-out indicia in place of a distributed cross-device ID.

FIG. 6 depicts flow chart 600 of a method of providing opt-out indicia in place of a distributed cross-device ID. At step 605, the browser can send to the server a request for a second webpage. At step 610, the server can send the second webpage. The second webpage can include cross-device ID retrieval instructions. At step 615, the browser can execute the cross-device ID retrieval instructions to send a request to the computing entity matching system. The request can include a matching system ID. At step 620, the computing entity matching system can determine a user of the browser has opted out of cross-device identification based on the matching system ID and/or the cross-device ID. At step 625, the computing entity matching system can send to the browser cross-device ID provision instructions including opt-out indicia instead of a distributed cross-device ID. The opt-out indicia can be any data that indicates the user has opted out. For example, the opt-out indicia can be the string "opt-out." At step 630, the browser can execute the cross-device ID provision instructions to send a request to the server (or a different server) including the opt-out indicia. In some embodiments, the server can then disassociate any browser activity by the browser that it previously associated with the distributed cross-device ID. For example, the server can remove any data it stores that indicates the browser activity is associated with the previously distributed cross-device ID.

Figure 7:
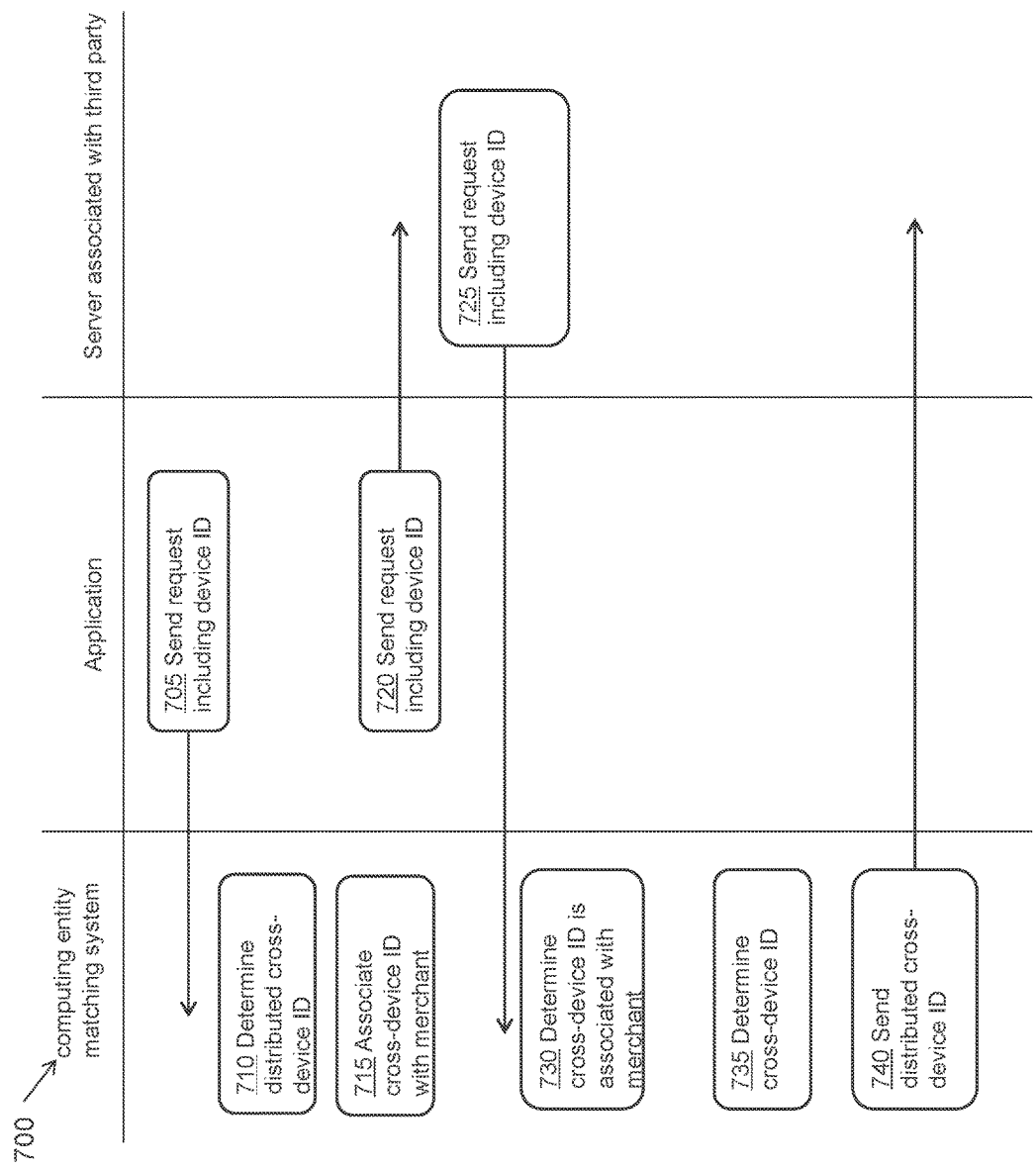
FIG. 7 depicts a flow chart of a method of providing cross-device identification information.

In some embodiments, the technology described herein can include provision of cross device-IDs in connection with applications, such as mobile apps. FIG. 7 depicts flow chart 700 of a method of providing cross-device identification information. At step 705, an application (e.g., application 110 or 117) can send a request to the computing entity matching system. The request can include a device ID of the computing device executing the application. For example, the device ID can be an IDFA or an ANDROID Advertising ID. In some embodiments, a server associated with a third-party (e.g., merchant system 130) can send the request including the device ID.

At step 710, the computing entity matching system can determine a cross-device ID based on the device ID. As previously discussed with reference to FIG. 2, the computing entity matching system can maintain associations between device IDs and cross-device IDs. The computing entity matching system can look up the cross-device ID based on the received device ID. At step 715, the computing entity matching system can associate the cross-device ID with the third-party. For example, the computing entity matching system can store an indication that it has received the device ID from the application associated with the third-party. Steps 705, 710, and 715 are optionally performed by the computing entity matching system to, for example, confirm the application associated with the third-party has interacted with the computing entity matching system at least once before provision of a cross-device ID. Beneficially, this can reduce instances of third-parties submitting device IDs for devices that are not running their applications.

At step 720, the application can send to the server associated with the third-party a request comprising its device ID. At step 725, the server can send to the computing entity matching system a request including the device ID. At step 730, the computing entity matching system can optionally determine the cross-device ID is associated with the third-party (e.g., in implementations where steps 705, 710, and 715 are performed). At step 735, the computing entity matching system can determine the cross-device ID based on the device ID. At step 740, the computing entity matching system can send to the server a distributed cross-device ID. The computing entity matching system can generate the distributed cross-device ID based on the cross-device ID. In some embodiments, the computing entity matching system can generate the distributed cross-device ID by applying a one-way hashing function (e.g., MD or SHA) to the cross-device ID. In some embodiments, the computing entity matching system can generate the distributed cross-device ID by encrypting the cross-device ID with an encryption key associated with the third-party. In some embodiments, the computing entity matching system can generate the distributed cross-device ID by applying a third-party-specific mapping to the cross-device ID. Beneficially, obfuscating the cross-device ID in a party-specific manner can limit which systems can use the distributed cross-device ID. In some embodiments, the distributed cross-device ID is the cross-device ID. Beneficially, the server can determine that the application activity is associated with the same user as other computing entities associated with the same cross-device ID.

In some embodiments, the computing entity matching system can determine whether a user of the application has opted out of cross-device identification. For example, a user of the application can elect to opt out of cross-device identification in response to a message previously displayed to the user in the application and/or in another application or web page. The computing entity matching system can associate the user's opt-out preference with the device ID and/or the cross-device ID in order to track the user's opt-out preference. If the user has opted out, the computing entity matching system can send opt-out indicia (e.g., the string "opt-out") instead of a distributed cross-device ID. If the user has not opted out, the computing entity matching system can provide the distributed cross-device ID.

Figure 8:
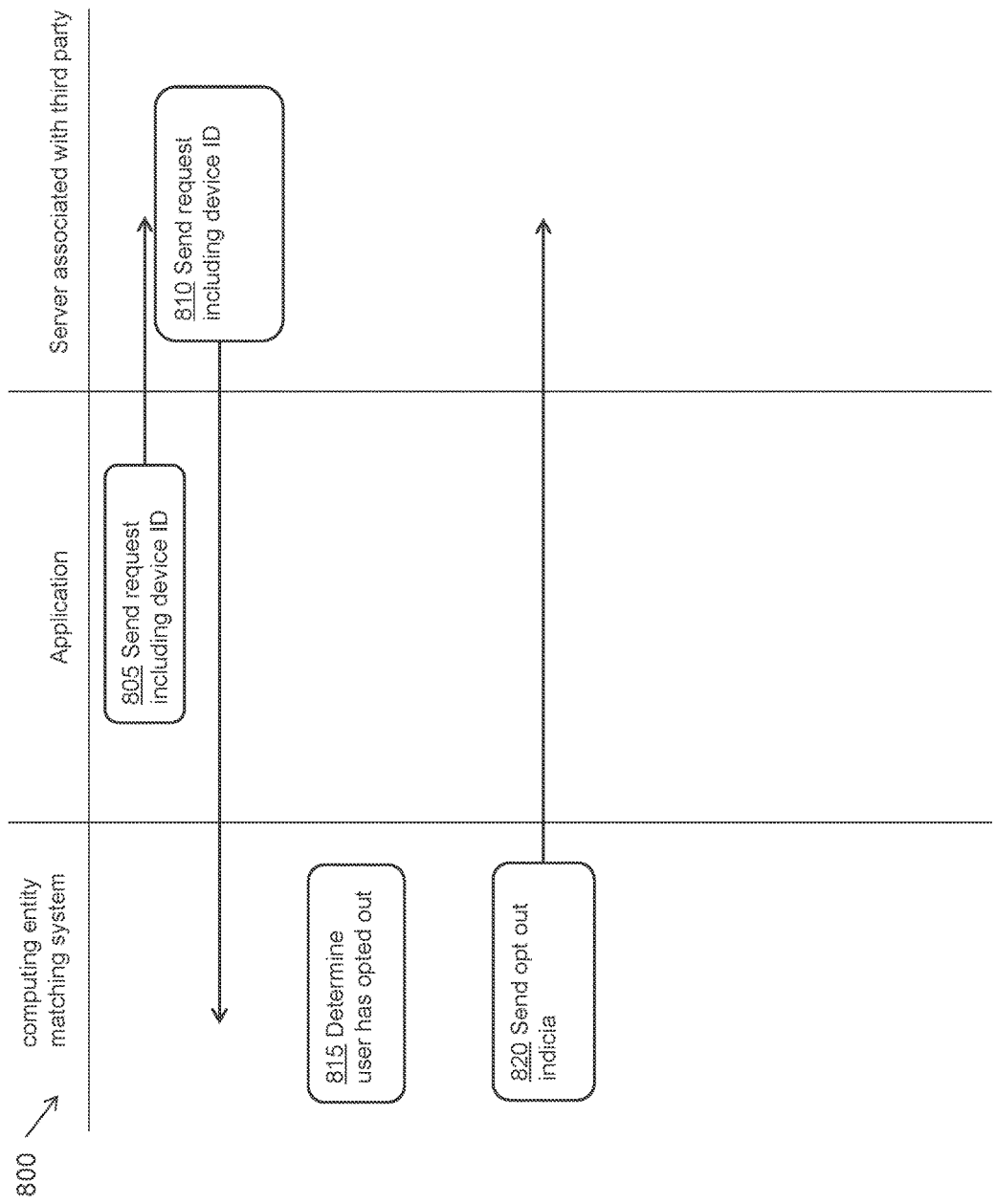
FIG. 8 depicts a flow chart of a method of providing opt-out indicia in place of a distributed cross-device ID.

FIG. 8 depicts flow chart 800 of a method of providing opt-out indicia in place of a distributed cross-device ID. At step 805, the application can send to the server associated with the third-party a request including the device ID. At step 810, the server can send to the computing entity matching system, a request including the device ID. At step 815, the computing entity matching system can determine a user of the application has opted out of cross-device identification based on the device ID and/or the cross-device ID. At step 820, the computing entity matching system can send opt-out indicia to the server. In some embodiments, the server can then disassociate any application activity by the application that it previously associated with the distributed cross-device ID.

Figure 9:
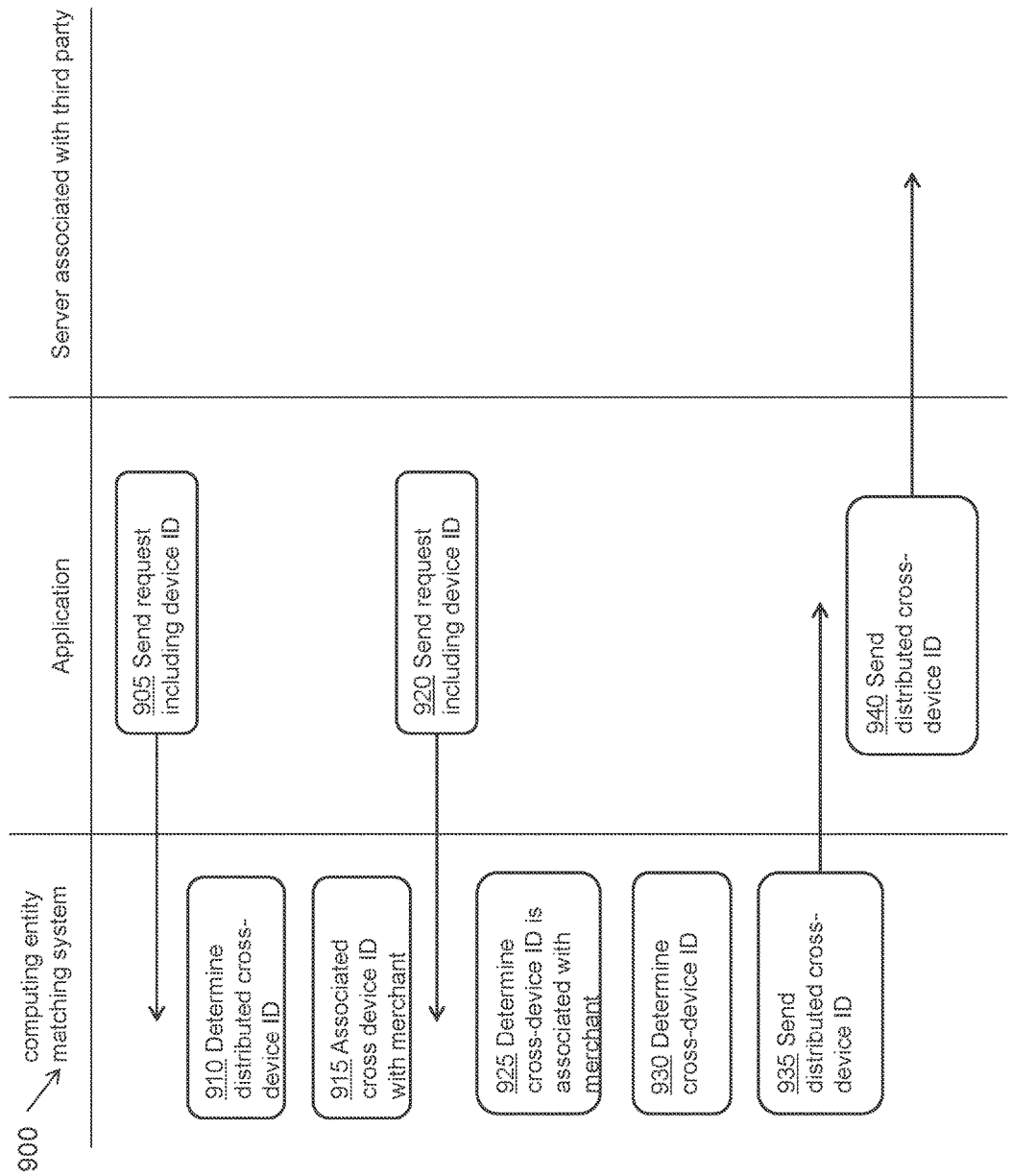
FIG. 9 depicts a flow chart of a method of providing cross-device identification information.

FIG. 9 depicts flow chart 900 of a method of providing cross-device identification information. At step 905, an application (e.g., application 110 or 117) can send a request to the computing entity matching system. The request can include a device ID of the computing device executing the application. In some embodiments, a server associated with a third-party (e.g., merchant system 130) can send the request including the device ID. At step 910, the computing entity matching system can determine a cross-device ID based on the device ID. At step 915, the computing entity matching system can associate the cross-device ID with the third-party. Steps 905, 910, and 915 are optionally performed by the computing entity matching system to, for example, confirm the application associated with the third-party has interacted with the computing entity matching system at least once before provision of a cross-device ID. Beneficially, this can reduce instances of third-parties submitting device IDs for devices that are not running their applications.

At step 920, the application sends to the computing entity matching system a request including its device ID. At step 925, the computing entity matching system can optionally determine the cross-device ID is associated with the third-party (e.g., in implementations where steps 905, 910, and 915 are performed). At step 930, the computing entity matching system can determine the cross-device ID based on the device ID. At step 935, the computing entity matching system can send to the application a distributed cross-device ID. The distributed cross-device ID can be generated in any of methods described above. At step 940, the application can send to the server the cross-device ID.

Figure 10:
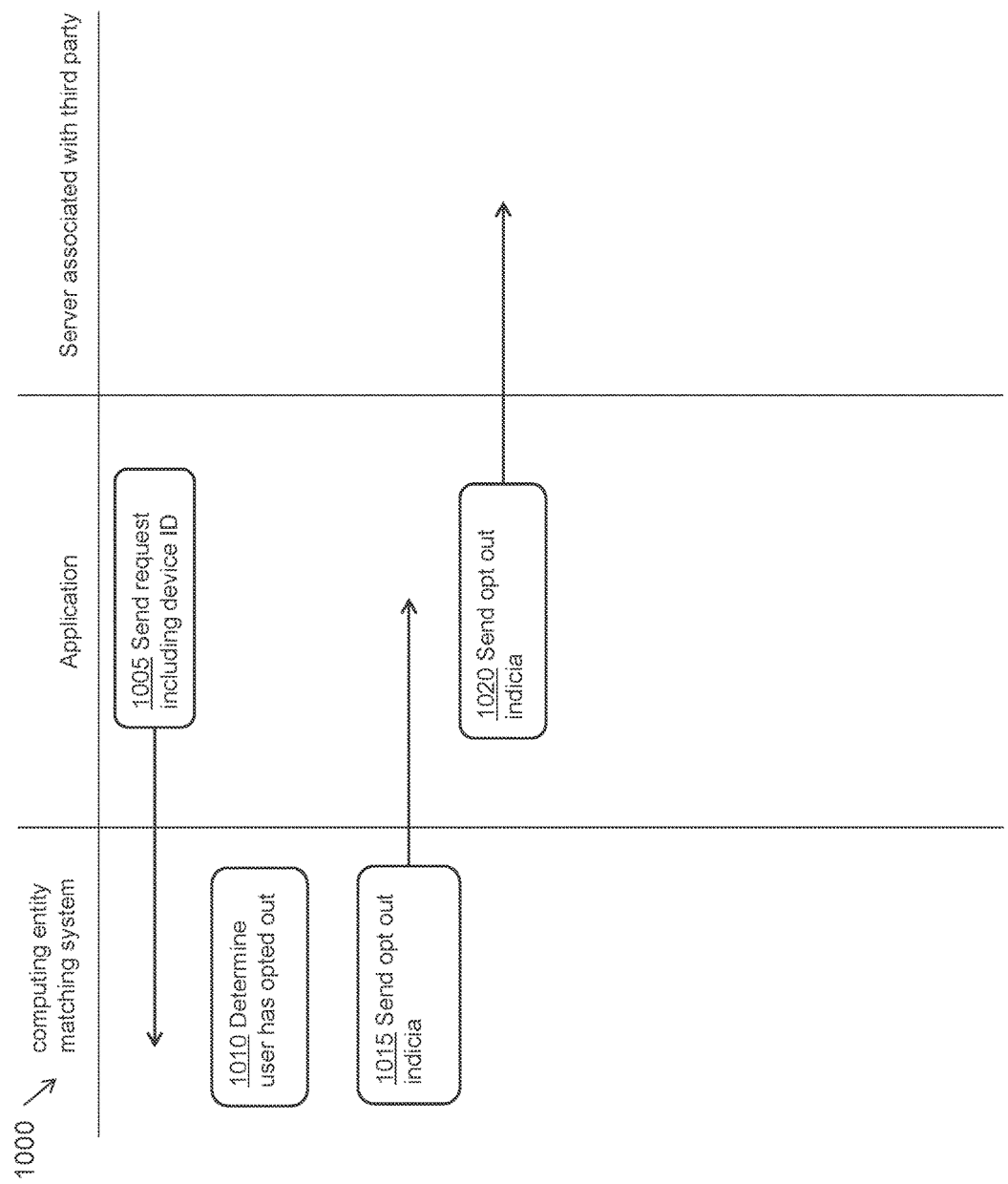
FIG. 10 depicts a flow chart of a method of providing opt-out indicia in place of a distributed cross-device ID.

FIG. 10 depicts flow chart 1000 of a method of providing opt-out indicia in place of a distributed cross-device ID. At step 1005, the application can send to the computing entity matching system a request including the device ID. At step 1010, the computing entity matching system can determine a user of the application has opted out of cross-device identification based on the device ID and/or the cross-device ID. At step 1015, the computing entity matching system can send opt-out indicia to the application. At step 1020, the application can send the opt-out indicia to the server. In some embodiments, the server can then disassociate any application activity by the application that it previously associated with the distributed cross-device ID.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method comprising:
   a. assigning, by a computing entity matching system on a first domain, a cross-device ID to a browser executing on a first computing device and to one or more computing entities based on one or more of activity data for the browser and the one or more computing entities collected by the computing entity matching system and activity data for the browser and the one or more computing entities collected by a plurality of third-parties;
   b. sending, by the browser, to a server on a second domain, a first request for a first webpage;
   c. receiving, by the browser, the first webpage, the first webpage comprising first cross-device ID retrieval instructions;
   d. executing, by the browser, the first cross-device ID retrieval instructions to send a second request to the computing entity matching system comprising a matching system ID;
   e. determining, by the computing entity matching system, the cross-device ID based on the matching system ID;
   f. sending, by the computing entity matching system, to the browser, first cross-device ID storage instructions comprising a distributed cross-device ID, the distributed cross-device ID based on the cross-device ID;
   g. executing, by the browser, the first cross-device ID storage instructions to set a cookie on the second domain comprising the distributed cross-device ID; and
   h. sending, by the browser, to the server, a third request for a second webpage, the third request comprising the distributed cross-device ID.

2. The method of claim 1, wherein each computing entity of the one or more computing entities is one of a computing device, a browser, or an application.

3. The method of claim 1, wherein the distributed cross-device ID is determined by applying a one-way hashing function to the cross-device ID.

4. The method of claim 1, wherein the first webpage and the second webpage are associated with a first third-party, and wherein the distributed cross-device ID is determined by encrypting the cross-device ID with an encryption key associated with the first third-party.

5. The method of claim 1, wherein the first webpage and the second webpage are associated with a first third-party, and wherein the distributed cross-device ID is determined by applying a first third-party-specific mapping to the cross-device ID.

6. The method of claim 1, wherein the distributed cross-device ID is the cross-device ID.

7. The method of claim 1, further comprising determining, by the computing entity matching system, a user of the browser has not opted out of cross-device identification based on one or more of the matching system ID or the cross-device ID.

8. The method of claim 1, further comprising associating, by the server, browser activity with the distributed cross-device ID.

9. The method of claim 1, further comprising:
   a. sending, by the browser, to the server on the second domain, a fourth request for a third webpage;
   b. receiving, by the browser, the third webpage, the third webpage comprising second cross-device ID retrieval instructions;
   c. executing, by the browser, the second cross-device ID retrieval instructions to send a fifth request to the computing entity matching system comprising the matching system ID and the distributed cross-device ID;
   d. determining, by the computing entity matching system, a user of the browser has opted out of cross-device identification based on one or more of the matching system ID or the cross-device ID;
   e. sending, by the computing entity matching system, to the browser, second cross-device ID storage instructions comprising opt-out indicia;
   f. executing, by the browser, the second cross-device ID storage instructions to replace the distributed cross-device ID in the cookie on the second domain with the opt-out indicia; and
   g. sending, by the browser, to the server, a sixth request for a fourth webpage, the sixth request comprising the opt-out indicia.

10. The method of claim 9, further comprising disassociating, by the server, browser activity of the browser with the distributed cross-device ID in response to receiving the opt-out indicia.

* * * * *